April 26, 1932.  H. A. WHEELER  1,855,619
WHEATSTONE BRIDGE FILTER
Filed Jan. 20, 1928
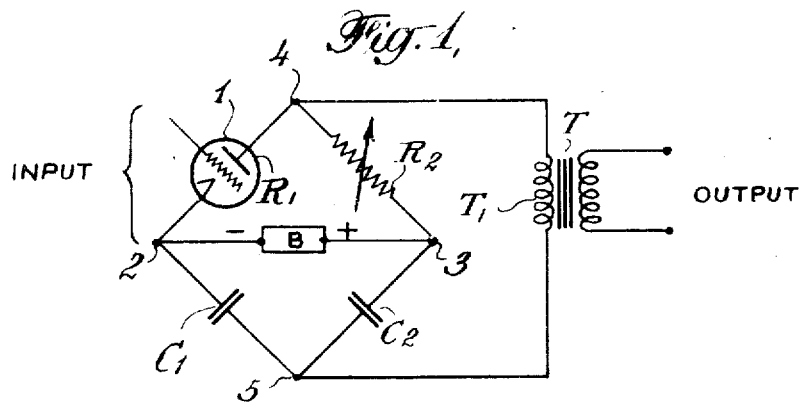
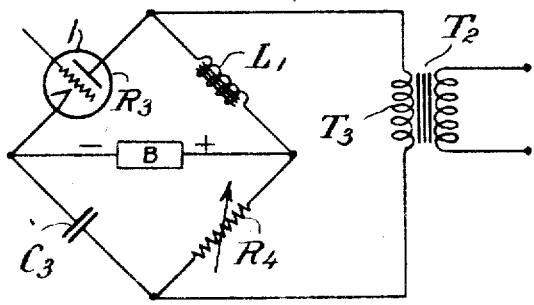
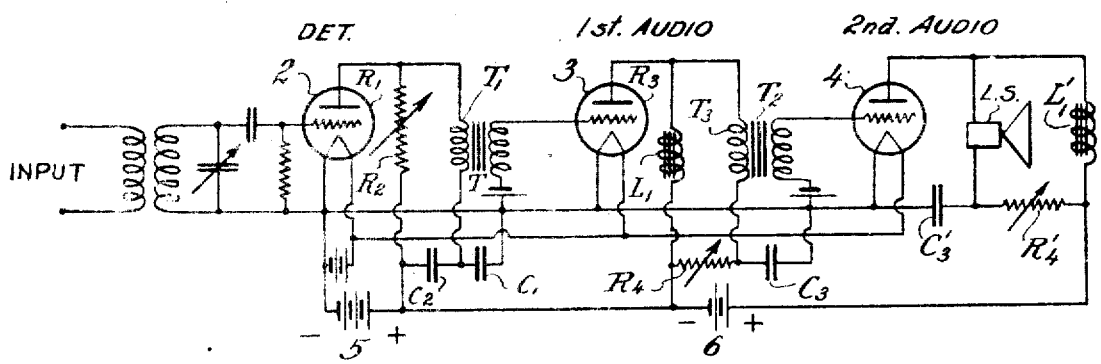
INVENTOR
*Harold A. Wheeler*
BY
*Pennie, Davis, Marvin & Edmonds*
ATTORNEYS Patented Apr. 26, 1932

1,855,619

UNITED STATES PATENT OFFICE

HAROLD A. WHEELER, OF GREAT NECK, NEW YORK, ASSIGNOR TO HAZELTINE CORPORATION, OF JERSEY CITY, NEW JERSEY, A CORPORATION OF DELAWARE

WHEATSTONE BRIDGE FILTER

Application filed January 20, 1928. Serial No. 248,074.

This invention relates to vacuum tube circuits and has to do, more particularly, with detector and audio-amplifier circuits. It is concerned with the suppression and elimination of disturbances resulting from voltage fluctuations across the terminals of the plate-current source.

A further object of the invention is to maintain a high quality of reproduction while suppressing the aforementioned disturbances.

Voltage fluctuations across the terminals of a plate-current-supply source may be due to either of two causes. First, the impedance of the plate-current-supply source—which is common to several or all of the vacuum tubes—may be so high that the relatively large pulsating current drawn by the audio-amplifier tubes, and particularly the power amplifier tube (when a tube of this kind is employed), will cause voltage fluctuations of considerable magnitude in the plate circuit of the detector tube and likewise the first audio-amplifier tube. These fluctuations are amplified by each successive stage of amplification and are fed back in amplified form through the common coupling path provided by the high impedance of the plate-current-supply source. Thus, oscillations may be generated, and these are usually of audible frequency. When of low frequency, this phenomenon is popularly referred to as "motor-boating", because of its similarity to the sound of a motorboat engine, and may occur whether the plate-current-supply source consists of a dry cell battery or a line-power rectifier and filter. In some cases it will occur where dry-cell batteries are used even when the batteries are new; but more often it does not manifest itself until the batteries are fairly old. This is because the internal resistance of dry cells increases considerably with age. Where a line-power rectifier and filter are used, the coupling impedance corresponding to the resistance of the dry-cell plate-current source consists of the impedance in shunt to the output terminals of the filter. This may be a capacity shunt, a resistance or both. Where the detector is supplied with plate current from the same filter as the other tubes, as is generally the case, it is common, although not universal practice to provide a fairly high resistance in shunt to the main output terminals of the filter, and to tap off from it the voltage required for each tube. This shunt resistance will provide a feed-back coupling path similar in effect to the resistance of a dry-cell plate battery. But whether or not there is a shunt resistance across the terminals of the filter there is always impedance of one form or another which is apt to produce the objectionable feed-back phenomenon. The present invention provides an effective remedy for these faulty conditions.

The second source of voltage fluctuation with which this invention is concerned is the residual fluctuation which is usually present at the output terminals of a line-power filter. The present invention provides an effective and inexpensive means for eliminating the objectionable audible hum under the circumstances just referred to, making it unnecessary to resort to the use of very expensive line-power filters.

The essential feature of this invention consists in what may be appropriately termed a "bridge filter" which is incorporated in the amplifier or associated circuits in such a way as to prevent the amplification or reproduction of any small voltage fluctuations which may occur across the terminals of the plate-current-supply source, irrespective of the underlying cause. The "bridge filter" is so called because it comprises a Wheatstone bridge network which is operative to counteract and thereby suppress the effects of small plate-voltage fluctuations on the performance of the amplifier as a whole.

In addition to fulfilling the primary requirement which has to do solely with the elimination or suppression of the effects of small plate-voltage fluctuations, the preferred embodiments of this invention are characterized by an inherent feature of very considerable advantage, namely: that the direct current plate supply to the vacuum tubes does not flow to any material extent through the primary windings of the coupling transformers as is usually the case in transformer-coupled amplifiers. Because of this, there is no initial or normal magnetization of the transformer cores—which condition is often responsible for undesirable attenuation of the low audio frequencies, the ordinary remedy for which lies in the use of large expensive transformers or other equally costly expedients. It is not pretended that it is novel to provide a circuit arrangement in an audio-frequency amplifier in which the direct plate current does not traverse the primaries of the coupling transformers, but as will be pointed out in connection with the detailed description to follow, this is an incidental and inherent advantage of the preferred bridge filter arrangements to be described and, as will further be pointed out, the elements required for the bridge filters, in addition to what would otherwise be required in order to avoid passing the direct current plate supply through the primary windings, are very few and inexpensive. Consequently, two very desirable advantages are realized at a cost which is but slightly more than one of them alone would normally involve.

In the drawings which accompany this specification, the two forms of Wheatstone bridge which have been preferred for use as bridge filters in accordance with the present invention are illustrated both in simple schematic form and as incorporated in a practical radio receiving circuit.

Referring to the drawings:

Figs. 1 and 2 are schematic diagrams, showing different forms of bridge filters, each of which is especially well adapted for a particular purpose.

Fig. 3 is a circuit diagram representing a vacuum tube detector in combination with a two-stage vacuum-tube audio-frequency amplifier wherein bridge filters of the forms illustrated by Figs. 1 and 2 are incorporated.

In the arrangement of Fig. 1, the four ratio arms of a Wheatstone bridge are formed by the elements $R_1$, $R_2$, $C_1$ and $C_2$. $R_1$ represents the alternating-current plate-filament resistance of the three-electrode vacuum tube 1. $R_2$ represents a resistance which, as indicated, may for convenience be variable. $C_1$ and $C_2$ are each condensers of suitable capacity; and these may be either fixed or variable, although it is usually more practicable that they be of fixed capacity. The element B represents any source of plate current for the vacuum tube 1. This may be a battery, a direct-current generator, a line-power rectifier and filter, or any other suitable source of plate current.

The output terminals of the plate-current source B are connected across one pair of conjugate points of the bridge marked 2 and 3, respectively, while the primary winding $T_1$ of an output transformer T is shown connected across the other pair of conjugate points marked 4 and 5, respectively. If the four arms of the bridge are each of such value that $$\frac{R_1}{R_2} = \frac{C_1}{C_2}$$

the bridge will be balanced for all frequencies and any voltage fluctuations across the points 2 and 3 will not cause any voltage fluctuations across the points 4 and 5. Accordingly, it will be seen that where only relatively small voltage fluctuations across the points 2 and 3 are involved, there will be substantially no fluctuation across the points 4 and 5. Since the output circuit, in this case the primary winding $T_1$, is connected across points 4 and 5, it is apparent that any small fluctuations in the voltage applied to the plate of the tube 1 will not be transmitted to any substantial degree through the coupling transformer T.

The arrangement of Fig. 1 is well adapted either as a detector or an amplifier, but it has a special advantage as a detector because of the resistance $R_2$ in series with the plate and the plate-current-supply source. This resistance may be made of such value as to permit of using the full amplifier voltage across the points 2 and 3—the voltage drop across $R_2$ being relied upon to compensate for the difference in voltages required on the detector tube and on the amplifier tubes. Any voltage fluctuations on the grid of tube 1, such as those caused by incoming signal waves, will be amplified and passed along through the coupling transformer T in the usual manner. This is because there is no balanced relation between the arm of the bridge including tube 1 and the output path including the primary winding $T_1$.

It is a noteworthy feature of the bridge filter of Fig. 1 that there is no direct-current path from the plate-current source B through the primary winding $T_1$. For this reason there is no initial or normal magnetization of the transformer core and consequently no resultant attenuation of low frequencies which usually follows when the direct current plate supply paths of the detector and audio tubes include the primary windings of the audio transformers.

The plate-current source B of Fig. 1 may be common to several tubes, any or all of which may as desired, be provided with bridge filters in accordance with this invention for suppressing in the output circuit fluctuations in the plate voltage supply. These voltage fluctuations may be of such magnitude that without the bridge filter serious disturbances would be introduced.

The bridge filter shown in Fig. 2 is a modification of that shown in Fig. 1. It will be noted that a choke coil $L_1$ has been substituted in Fig. 2 for the resistance $R_2$ of Fig.

1, and that a variable resistance $R_4$ has been substituted for the condenser $C_2$ of Fig. 1. The operation of the circuit of Fig. 2 is substantially that of Fig. 1 except as will now be pointed out.

The condition of balance for the bridge filter of Fig. 2 is also independent of the frequency, and may be represented by the equation $$R_3 R_4 = \frac{L_1}{C_3}.$$

The bridge filter of Fig. 2 is considered to be more especially adapted for use in the amplifier stages, for the reason that the inductance $L_1$ may be constructed to have a low direct current resistance, thereby avoiding any considerable direct current voltage drop therein while at the same time providing a high alternating current impedance. With the arrangement of Fig. 2, it will be noted that there is a direct-current path in shunt with the inductance $L_1$ traced from the plate terminal of tube 1 through the primary winding $T_3$ of the output transformer and through resistance $R_4$ to the positive battery terminal. A portion of the space current flowing through tube 1 therefore flows through the primary winding $T_3$ of the output transformer but this current is negligibly small due to the low direct-current resistance of the inductance $L_1$ as compared to the relatively high resistance of element $R_4$ and winding $T_3$.

Bridge filters of the type disclosed herein should be designed to introduce a minimum of energy loss to the signaling currents transmitted therethrough from the input to the output sections. Referring to Fig. 1, an incoming signaling current is impressed across the input circuit to cause the generation of a corresponding voltage in the plate circuit of tube 1. A resulting maximum effect in the output circuit is obtained when as large a percentage as practicable of the plate-circuit voltage thus generated is impressed across the transformer winding $T_1$. Now, since resistance $R_2$ is in shunt with winding $T_1$, and the circuit comprising element $C_1$ shunted by source B and element $C_2$ in series is connected in series with transformer winding $T_1$, as regards the amplified signaling current both of these factors operate to cause a reduction in the voltage impressed across the winding $T_1$ as compared to the voltage that would be impressed if the bridge filter were omitted. An inspection of Fig. 1 will show, however, that this voltage reduction, due to the bridge network, may be minimized by making elements $C_1$, $C_2$ and B of low impedance as compared to element $R_2$. Particularly should element $C_1$ have a low impedance and element $R_2$ a high impedance. Similarly in Fig. 2 the impedance of element $C_3$ should be low in comparison with that of $L_1$.

In both cases the impedance in shunt to the plate and filament of the tube and to the primary of the output transformer should be high at all frequencies within the desired audio-frequency range. All of these conditions can be easily met in practice.

In Fig. 3, bridge filters in accordance with both Figs. 1 and 2 are shown incorporated in a vacuum tube detector and two-stage audio-amplifier circuit. In this circuit, the tube 2 is a detector, tube 3 the first audio amplifier and tube 4 the second and final amplifier. The required detector plate voltage may, for the purpose of this description, be assumed to be of the usual magnitude which ranges from 22½ to 45 volts; the plate voltage of the first audio-amplifier tube may be assumed to be 90 volts; and the plate voltage of the second audio-amplifier tube may be of the order of 180 volts.

The sources of plate current are represented by batteries 5 and 6, but it is understood that a line-power rectifier and filter or any other suitable potential source may be substituted therefor if desired.

The bridge filter employed in conjunction with the detector tube 2 is identical with that of Fig. 1; while the bridge filters employed in conjunction with the audio-amplifier tubes are both in accordance with Fig. 2. The reference letters used in Figs. 1 and 2 to identify the several elements have been employed in Fig. 3 to identify the corresponding elements. In the second audio stage, however, these reference letters have been primed in order to distinguish from those used for the corresponding elements of the first audio stage.

It will be noted that the plate circuits of the detector tube and the first audio tube are conneced to the same plate-battery terminal. The reduction of voltage required for the detector tube is effected by the resistance $R_2$. Since the choke coil $L_1$ has only a relatively small direct current resistance, the plate circuit of the first audio tube receives practically the full voltage of the particular battery 5. Having assumed the second audio tube 4 to be a "power" tube requiring higher plate voltage than the first audio tube, the additional plate battery 6 is required. If the same kind of tube were to be used in the second audio stage as in the first an additional plate voltage would not be required and the battery 6 could be omitted.

In the output of the second audio stage there is included a loud speaker marked "L. S". This is inserted in the place that would otherwise be occupied by the primary winding $T_3$ of Fig. 2. It is obvious, of course, that the interstage coupling of tubes need not necessarily be accomplished by means of transformers, but that arbitrary coupling impedances could be used in their stead. Likewise, a coupling transformer is not necessary in the ouput circuit of the final stage, but an acoustical or other device being associated directly with the plate circuit as is shown in Fig. 3.

The particular bridge circuits shown in the drawings have been selected in preference to others that might be used owing to their advantage in forcing all of the direct current delivered from source B to flow in the plate circuit of the tube associated with the bridge. This condition is assured by the use of the condenser in the balancing arm connected jointly to the negative battery terminal and the tube cathode. Occasion might arise, however, where a condenser would not be desirable in such balancing arm, and it is to be understood, of course, that the present invention is not to be limited to the specific arrangements disclosed in the drawings, but is to be considered as covering arbitrary arrangements of impedance elements in the balancing arms as desired.

Heretofore, where it has been desired to divert the direct-current plate current away from the primary windings of the audio frequency output transformers in order to avoid excessively attenuating the frequencies in the audible range, the practice has been to insert a large fixed condenser in series with each primary winding, and to feed the plate current to the corresponding tubes through high-inductance choke coils. This practice is familiar to those skilled in the art; and it should be apparent from examination of Fig. 2, that the use of bridge filters as therein illustrated involves the use of a single resistance only in addition to the apparatus that is normally required for the purpose just mentioned.

As a guide for the assemblage of a detector and audio-frequency amplifier in accordance with Fig. 3, approximate values for certain of the elements shown in that figure will be given. Assuming the detector tube 2 and first audio tube 3 to be of the conventional UX-201-A type and the second audio tube 4 to be of UX-171 type, the more important values are approximately as follows:

$R_2$ = 50,000 ohms,
$R_4$ = 10,000 ohms,
$R_4'$ = 10,000 ohms,
$L_1$ = 100 henries,
$L_1'$ = 50 henries,
$C_1$ = .25 microfarad,
$C_2$ = .1 microfarad,
$C_3$ = 1 microfarad,
$C_3'$ = 2 microfarads.

It is unnecessary to give any specifications regarding the transformers, as their dimensions have no particular bearing on the operation of the present invention. The values specified above may, of course, be altered as conditions and circumstances require.

Obviously, there are a great variety of modifications which it is possible to devise; but since none appears to be characterized by any important advantage which is not to be found in the specific arrangements shown, it is not deemed necessary to disclose additional modifications herein.

What is claimed is:

1. A bridge network comprising several balancing arms and two conjugate arms, one conjugate arm including a source of fluctuat- thermionic device, said several balancing arms including the space-path resistance of a thermionic device, said several balancing arms being proportioned to balance said bridge network with respect to the space-path resistance offered by said device to the current fluctuations of said source.

2. A bridge network comprising several balancing arms and two conjugate arms, one conjugate arm including a source of direct current subject to undesired low-frequency fluctuations, only one of said balancing arms including the vacuum tube space-path resistance, said several balancing arms being proportioned to balance said bridge network with respect to the space-path resistance of said vacuum tube to the low-frequency current fluctuations of said source.

3. A bridge network comprising several balancing arms and two conjugate arms, only one of said balancing arms including a vacuum tube plate-cathode resistance, one of said conjugate arms including a direct-current source for supplying said resistance, said direct-current source being subject to fluctuations, and said several balancing arms being proportioned to balance said bridge network with respect to the plate-cathode resistance offered by said vacuum tube to the current fluctuations of said source.

4. A bridge network comprising several balancing arms and two conjugate arms, one of said balancing arms including a vacuum tube cathode-plate resistance, one of said conjugate arms including a direct-current source for supplying said resistance, said current source being subject to undesired fluctuations, and an output circuit included in the other conjugate arm, said several balancing arms being proportioned to balance said bridge network with respect to the cathode-plate resistance of said vacuum tube to said current fluctuations of said source, whereby said undesired fluctuations of said source are rendered ineffective in said output circuit.

5. A bridge network comprising four balancing arms in a closed series circuit and two conjugate arms, one of said balancing arms comprising the cathode-plate resistance of a thermionic device, an adjacent balancing arm including a series capacity, and a direct-current source subject to undesired fluctuations associated with the conjugate arm which extends between said adjacent balancing arms for supplying current to said resistance.

6. A bridge network balanced for current fluctuations, comprising four balancing arms in a closed series circuit and a pair of conjugate arms, one of said balancing arms comprising the cathode-plate resistance of a thermionic device, an adjacent balancing arm including a series capacity, one of said conjugate arms having one terminal between said adjacent balancing arms and including a direct-current source subject to undesired fluctuations, said source being adapted to supply current to said resistance, and an output circuit included in the remaining conjugate arm.

7. In combination, a bridge network balanced for fluctuating currents, comprising several balancing and two conjugate arms, one of said balancing arms including the cathode-plate resistance of a thermionic device, one of said conjugate arms including a direct-potential source adapted to supply current to said cathode-plate resistance, an output circuit included in the remaining conjugate arm, said several balancing arms being proportioned to balance said bridge network with respect to the cathode-plate resistance of said thermionic device to undesired current fluctuations of said source whereby said undesired fluctuations of said source are rendered ineffective in said output circuit, a grid electrode associated with said thermionic device, and an input circuit associated with the grid and cathode of said device.

8. A bridge network balanced for current fluctuations, comprising the series connection extending from plate to cathode of a thermionic device, a first impedance element traversable by direct current, a second impedance element and a capacity, and a direct-potential source having the negative terminal thereof connected to said cathode and the positive terminal connected between said first and second impedance elements.

9. A bridge network balanced for current fluctuations, comprising the series connection extending from plate to cathode of a thermionic device, a first impedance element traversable by direct current, a second impedance element and a capacity, a direct-potential source having the negative terminal thereof connected to said cathode and the positive terminal connected between said first and second impedance elements, and an output section connected from said plate to a point between said second impedance element and said capacity, said serially connected elements being proportioned to render said potential source and output circuit conjugate, whereby, with said cathode suitably energized, fluctuations of said source are suppressed in said output section.

10. In a combination as set forth in claim 9, a grid electrode associated with said thermionic device, and an input section associated with the grid and cathode thereof, said serially connected elements being further proportioned to minimize the energy losses between said input and output sections.

11. In a combination as set forth in claim 9, a grid electrode associated with said thermionic device, and an input section associated with the grid and cathode thereof, said serially connected elements being further proportioned to minimize the energy losses between said input and output sections, and the direct-current resistance of said first impedance element being proportioned to adjust the potential from said source impressed across said cathode-plate resistance to a suitable operating value.

12. A vacuum tube system responsive to audio frequencies comprising in combination, a direct-current source, a thermionic device having the cathode thereof connected to the negative terminal of said source and the plate connected thru a resistance to the positive terminal, a pair of capacities in series shunting the terminals of said source, and an output section connected from said plate to a point between said capacities, said capacities being proportioned to render said potential source and output section conjugate for current fluctuations, whereby, with said cathode suitably energized, fluctuations of said source are suppressed in said output section, said resistance being proportioned to adjust the cathode-plate current to a desired operating value.

13. A vacuum tube system responsive to audio frequencies comprising in combination, a direct-current source, a thermionic device having the cathode thereof connected to the negative terminal of said source and the plate connected thru an inductance to the positive terminal, a capacity and resistance in series connected from the negative to the positive terminal of said source, and an output section connected from said plate to a point between said resistance and capacity, said capacity, resistance and inductance elements being proportioned to render said source and said output section conjugate to current fluctuations, whereby, with said cathode suitably energized, current fluctuations of said source are suppressed in said output section.

14. In combination, in series connection extending from plate to cathode of a thermionic device, a resistance, a first capacity and a second capacity, a direct-potential source having the negative terminal thereof connected to said cathode and the positive terminal connected between said resistance and first capacity, and an output circuit connected from said plate to a point between said first and second capacities, said serially connected elements being proportioned to render said potential source and output circuit conjugate to current fluctuations with said cathode suitably energized, whereby fluctuations of said source are suppressed in said output circuit.

15. In combination, in series connection extending from plate to cathode of a thermionic device, an inductive element, a resistance and a capacity, a direct-potential source with the negative terminal thereof connected to said cathode and the positive terminal connected between said inductance and resistance, an output section extending from said plate to a point common to said resistance and capacity, and means for suitably energizing said cathode, said serially connected elements being proportioned to render said potential source and output section conjugate for current fluctuations, whereby fluctuations of said source are suppressed in said output section.

16. In a combination as set forth in claim 15, a grid electrode associated with said thermionic device, and an input section associated with the grid and cathode of said device, said serially connected elements being further proportioned to minimize energy losses between said input and output sections, and the direct-current resistance of said inductive element being proportioned to adjust the potential of said source impressed between said cathode and plate to a desired operating value.

17. A bridge network comprising several balancing arms and two conjugate arms, only one of said balancing arms including the space-path resistance of a thermionic device, and one of said conjugate arms including a source of current, subject to fluctuation, for supplying said space-path resistance, said several balancing arms being proportioned to balance said bridge with respect to the resistance offered by said space-path to the current fluctuations of said source.

18. A bridge network comprising several balancing arms and two conjugate arms, only one of said balancing arms including the space-path resistance of a thermionic device, and one of said conjugate arms including an undesirably fluctuating source of direct current for supplying said space-path, said several balancing arms being proportioned to balance said bridge with respect to the resistance offered by said space-path to said undesired current fluctuations of said source.

19. The combination with a vacuum tube system comprising a plurality of vacuum tubes coupled in cascade, each tube having anode, cathode and grid, of a common source for supplying space current to all said tubes, said source being subject to undesired fluctuations, and a bridge network balanced for current fluctuations associated with at least one of said tubes comprising several balancing arms and two conjugate arms, only one of said balancing arms including the space-path resistance of said tube associated therewith, one said conjugate arm including said space-current supply source, and the other said conjugate arm including an output circuit.

20. The combination with a vacuum tube system comprising a plurality of vacuum tubes coupled in cascade, each tube having anode, cathode and grid, of a common source for supplying space current to all said tubes, said source being subject to undesired fluctuations, and a bridge network associated with at least one of said tubes comprising several balancing arms and two conjugate arms, only one of said balancing arms including the space-path resistance of said tube associated therewith, said conjugate arm including said space-current supply source, and the other said conjugate arm including an output circuit, said several balancing arms being proportioned to balance said bridge with respect to the space-path resistance offered by said tube to the current fluctuations of said source.

21. The combination with a vacuum tube system comprising a plurality of vacuum tubes coupled in cascade, each tube having anode, cathode and grid, of a common source of direct current for supplying space current to all said tubes, said source being subject to undesired fluctuations, and a bridge network associated with at least one of said tubes comprising several balancing arms and two conjugate arms, only one of said balancing arms including the space-path resistance of said tube associated therewith, one said conjugate arm including said space-current supply source, and the other said conjugate arm including an output circuit, said several balancing arms being proportioned to balance said bridge with respect to the space-path resistance offered by said tube to the current fluctuations of said source.

22. The combination with a vacuum tube system comprising a plurality of vacuum tubes coupled in cascade, each tube having anode, cathode and grid, of a common source for supplying space-current to all said tubes, said source being subject to current fluctuations, and a bridge network balanced for current fluctuations individual to each said tube, each said bridge comprising several balancing arms and two conjugate arms, only one of said balancing arms of each bridge including the space-path resistances of the tube associated therewith, one said conjugate arm including said common space-current supply source, and the other said conjugate arm including an output circuit.

23. The combination with a vacuum tube system comprising a plurality of vacuum tubes coupled in cascade, each tube having anode, cathode and grid, of a common source of direct current for supplying space-current to all said tubes, said source being subject to undesired fluctuations, and a bridge network individual to each said tube comprising several balancing arms and two conjugate arms, only one of said balancing arms of each bridge including the space-path resistance of the tube associated therewith, one said conjugate arm including said space-current supply source, and the other said conjugate arm including an output circuit, said several balancing arms of each bridge being proportioned to balance said bridge with respect to the space-path resistance offered by said tube to the current fluctuations of said source.

24. The combination with a vacuum tube system comprising a plurality of vacuum tubes coupled in cascade, each tube having anode, cathode and grid, of a common source for supplying space-current to all said tubes, said source being subject to current fluctuations, and a bridge network balanced for current fluctuations associated with at least one said tube comprising several balancing arms and two conjugate arms, only one of said balancing arms including the space-path resistance of the tube associated therewith, an adjacent balancing arm including a capacity, said common source being included in the conjugate arm having a terminal common to said capacity and said space-path resistance, and the other said conjugate arm including an output circuit.

In testimony whereof I affix my signature.

HAROLD A. WHEELER.

CERTIFICATE OF CORRECTION.

Patent No. 1,855,619.                                       April 26, 1932.

HAROLD A. WHEELER.

It is hereby certified that error appears in the printed specification of the above numbered patent requiring correction as follows: Page 3, line 108, for the misspelled word "conneced" read connected; page 4, line 76, beginning with the words "A bridge" strike out all to and including the word "source" in line 85, comprising present claim 1, and insert the following as claim 1:-

1. A bridge network comprising several balancing arms and two conjugate arms, one conjugate arm including a source of fluctuating direct current, only one of said balancing arms including the space-path resistance of a thermionic device, said several balancing arms being proportioned to balance said bridge network with respect to the space-path resistance offered by said device to the current fluctuations of said source.

same page, line 91, claim 2, for "the" read a; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.

of each bridge including the space-path resistance of the tube associated therewith, one said conjugate arm including said space-current supply source, and the other said conjugate arm including an output circuit, said several balancing arms of each bridge being proportioned to balance said bridge with respect to the space-path resistance offered by said tube to the current fluctuations of said source.

24. The combination with a vacuum tube system comprising a plurality of vacuum tubes coupled in cascade, each tube having anode, cathode and grid, of a common source for supplying space-current to all said tubes, said source being subject to current fluctuations, and a bridge network balanced for current fluctuations associated with at least one said tube comprising several balancing arms and two conjugate arms, only one of said balancing arms including the space-path resistance of the tube associated therewith, an adjacent balancing arm including a capacity, said common source being included in the conjugate arm having a terminal common to said capacity and said space-path resistance, and the other said conjugate arm including an output circuit.

In testimony whereof I affix my signature.

HAROLD A. WHEELER.

CERTIFICATE OF CORRECTION.

Patent No. 1,855,619.  April 26, 1932.

HAROLD A. WHEELER.

It is hereby certified that error appears in the printed specification of the above numbered patent requiring correction as follows: Page 3, line 108, for the misspelled word "conneced" read connected; page 4, line 76, beginning with the words "A bridge" strike out all to and including the word "source" in line 85, comprising present claim 1, and insert the following as claim 1:-

1. A bridge network comprising several balancing arms and two conjugate arms, one conjugate arm including a source of fluctuating direct current, only one of said balancing arms including the space-path resistance of a thermionic device, said several balancing arms being proportioned to balance said bridge network with respect to the space-path resistance offered by said device to the current fluctuations of said source.

same page, line 91, claim 2, for "the" read a; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.

CERTIFICATE OF CORRECTION.

Patent No. 1,855,619. April 26, 1932.

HAROLD A. WHEELER.

It is hereby certified that error appears in the printed specification of the above numbered patent requiring correction as follows: Page 3, line 108, for the misspelled word "conneced" read connected; page 4, line 76, beginning with the words "A bridge" strike out all to and including the word "source" in line 85, comprising present claim 1, and insert the following as claim 1:-

1. A bridge network comprising several balancing arms and two conjugate arms, one conjugate arm including a source of fluctuating direct current, only one of said balancing arms including the space-path resistance of a thermionic device, said several balancing arms being proportioned to balance said bridge network with respect to the space-path resistance offered by said device to the current fluctuations of said source.

same page, line 91, claim 2, for "the" read a; and that the said Letters Patent should be read with these corrections therein that the same may conform to the record of the case in the Patent Office.

Signed and sealed this 12th day of July, A. D. 1932.

(Seal)

M. J. Moore,
Acting Commissioner of Patents.